United States Patent Office 3,640,932
Patented Feb. 8, 1972

3,640,932
COMPOSITIONS FOR SAND CORE MOLD ELEMENTS
Joel M. Schnur, Agawam, Mass., assignor to Monsanto Company, St. Louis, Mo.
No Drawing. Filed Oct. 21, 1968, Ser. No. 769,384
Int. Cl. C08g 51/04, 51/24
U.S. Cl. 260—29.3
10 Claims

ABSTRACT OF THE DISCLOSURE

Foundry sand core mold elements having improved structural characteristics are made by compositing sand with a water soluble sulfonated resole resin composition.

BACKGROUND

Since time immemorial, the foundry arts have employed sand cores and shells in the casting of metal, especially iron. Over the centuries, a variety of different sand binder systems have been employed. Since the early years of the present century, phenolic resins have been extensively used with sand to make cores and shells, but the art is always seeking new and different phenolic resins which will alter and improve the properties of sand cores and shells made using such resins as a binder.

It has now been discovered that sand cores using a certain water soluble sulfonated resole resin composition can be employed to produce sand cores having a combination of physical properties which are improved over known prior art sand cores made with other phenol-aldehyde resin systems. In particular, the sand cores made using such a sulfonated resole resin characteristically have surprisingly improved green strengths together with unexpectedly high cured tensile strengths.

SUMMARY

This invention relates to improved compositions comprising sand, water, and, initially dissolved in the water, sulfonated resole resins. The invention also relates to thermoset cores produced from such compositions.

The improved compositions of this invention comprise in combination a uniform mixture of from about 95 to 98.5 weight percent sand and the balance up to 100 weight percent of any given composition being an aqueous solution of a sulfonated resole resin composition. Such an aqueous solution of such resin composition comprises (on a 100 parts by weight total basis) from about 30 to 80 parts by weight of sulfonated resole resin composition, with the balance up to 100 weight percent of any given solution thereof being water.

In general, the water soluble sulfonated resole resin compositions suitable for use in this invention are composed of two different classes of resinous materials.

One class of these materials are water soluble, methylolated sulfonated phenol-aldehyde resole resins. They are conveniently prepared by contacting under base catalyzed (e.g. above pH7), liquid phase aqueous conditions a molar excess of formaldehyde with at least one phenol sulfonic acid characterized in its pure form by the general formula:

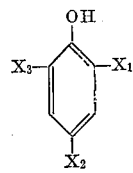

where $X_1$, $X_2$ and $X_3$ are each individually selected from the group consisting of hydrogen, and —$SO_3H$, and, in any given molecule thereof, at least one of said X's is —$SO_3H$ and at least one other of said X's is hydrogen, the contacting being continued under time-temperature-pressure conditions which taken together are at least sufficient to methylolate said phenol-sulfonic acid.

Typical reaction or contacting temperatures range from about 50° C. up to the boiling point (i.e. reflux conditions) of the reaction mixture (temperatures of from about 70° C. to 80° C. being preferred). Convenient reaction times typically range from about 20 minutes to 4 hours. Preferably, the pH is maintained in the range of from about 7.5 to 10. At pH values above about 7.5, not only is the sulfonic acid salt formed, but also a sufficient percentage of phenate anions are formed to activate ortho and para positions on the phenyl nucleus relative to the hydroxyl group, which is desirable in methylolating Formula 1 compounds with formaldehyde. At pH values above about 10, the undesirable Canizzaro reaction can occur as a side reaction. Vacuum reflux reaction conditions or other means can be used to limit condensation of product methylolated compounds and control reaction temperature (through steam evolution). Organic liquids may be present but it is much preferred that at least 50 weight percent of the total liquid comprising the liquid phase be water.

To maintain the desired basic pH, any basic catalyst conventionally known to the art of resole resins can be employed, such as metal hydroxides of metals from Groups I, II, and III of the Periodic Table of the Elements, but, preferably, for purposes of this invention, alkali metal hydroxides, especially sodium hydroxide, are used. As made, the methylolated, sulfonated products are thus in a salt form, cations present having been derived from the base catalyst used.

A preferred class of such a monomeric methylolated sulfonated product is monomeric, contains only a single —$SO_3H$ group in the form of a metal salt or ammonium salt per molecule, depending on the cations associated with the base catalyst employed in manufacture, and so is in base form (i.e. not neutralized or acidified); and has two —$CH_2OH$ (methylol) groups per molecule. The presence of two —$CH_2OH$ groups per molecule insures complete polymerizability of a methylolated and sulfonated product, as those skilled in the art will readily appreciate. For reasons of structural predictability in the ultimate resole resin compositions of the invention, a more preferred class of such preferred class of products contains a single such sulfonic acid salt group per molecule each located in the para position relative to phenolic (nuclear) hydroxyl groups.

Although such methylolated, sulfonated products can be readily separated as solids or concentrates from a reaction product mixture (as by vacuum distillation of fluids, or the like), for use in this invention, such products are employed in the form of aqueous solutions containing from about 30 to 80 weight percent total of such products. More preferred such solutions contain from about 60 to 70 weight percent of such products.

Preferably, such an aqueous solution is prepared so as to contain very little (e.g. less than about 5 weight percent based on total weight of methylolated product) dissolved free formaldehyde, but it can be prepared to contain higher percentages of such, depending upon reaction conditions employed, and the end uses intended for such.

Typically, a water soluble methylolated sulfonated product used in this invention is composed of monomeric and polynuclear derivatives thereof, the relative amount of polynuclear derivatives in any given such product being dependent upon the degree of advancement associated therewith, as those skilled in the art will appreciate.

Water soluble polynuclear derivatives (including dimers, trimers, etc.) of such methylolated, sulfonated products are readily prepared by heating an aqueous solution of about 30 to 80 weight percent thereof (preferably largely monomeric methylolated phenol sulfonic acid compounds) to temperatures ranging from about 70° C. up to about atmospheric reflux for times sufficient to polymerize or advance the monomeric products and produce the desired polynuclear derivatives thereof.

In general, the mol ratio of combined formaldehyde to phenol in methylolated sulfonated products (conveniently calculated from the starting phenol sulfonic acid used) in the water soluble products used in this invention can range from about 1:1 to 2:1, although ratios of from about 1.5:1 to 2:1 are preferred. To promote production of such products having a relatively high mol ratio of formaldehyde to phenol, it is preferred to employ a large molar excess of formaldehyde per mol of phenol in batch reactors, a mol ratio of at least 5:1 being more preferred, and a mol ratio of at least 10:1 being still more preferred. The amount of water present is relatively unimportant, though excessively dilute and excessively concentrated aqueous reaction mixtures cut down process efficiency, as those skilled in the art will appreciate. The unreacted formaldehyde remaining at the end of a reaction can be subsequently reacted with post-reaction added phenol to form in situ a phenol aldehyde resin, as described further below.

While Formula 1 compounds can be prepared by methods known to the prior art, a particularly preferred preparation method for the present invention involves reaction of phenol with sulfuric acid under conditions such that for each mol of phenol there is present at least about one mol of sulfuric acid. The reaction or contacting of phenol with sulfonic acid is conducted under liquid phase conditions using sub-atmospheric pressures of from about 20 to 29 in. Hg vacuum at temperatures ranging from about 85° to 95° C. The water generated through reaction of the sulfuric acid with the phenol is continuously removed by distillataion from the reaction zone so as to promote a substantially complete reaction between sulfuric acid and phenol, thereby avoiding possible later problems of product purification.

The particular Formula 1 compound used (whether made as just described or otherwise) to make a water soluble, methylolated, sulfonated product is water soluble and is conveniently neutralized and made basic with a base catalyst as indicated above before reaction with formaldehyde.

The second class of materials used to make the sulfonated resole resin compositions employed in this invention are conventional water soluble, non-sulfonated thermosettable phenol-aldehyde resole resins. These resins are mixed with the above-described methylolated, sulfonated products in quantities at least sufficient to make the resulting resin composition thermosettable since by themselves these methylolated, sulfonated products are characteristically poorly or even not at all thermosettable by the action of heat alone. Because the number of reaction sites available in a given conventional resole resin are variable from one such product to another, it will be appreciated by those skilled in the art that no definite numerical limitations can be or need be used to describe for all cases the exact minimum quantity of a conventional resole resin which must be added to or composited with a methylolated, sulfonated product to make the composite composition thermosettable by the action of heat alone. Commonly, as little as 10 parts by weight of conventional resole resin per 100 parts by weight of methylolated, sulfonated product is sufficient to impart thermosettability to the resulting composition. Up to 2000 or even more parts by weight of a conventional resole resin per 100 parts by weight of such methylolated, sulfonated product can advantageously be employed, the ratio used in any given instance being influenced by the particular composition properties desired and the end use intended.

Preferably, for each 100 parts by weight of such methylolated sulfonated product, one preferably employs from about 100 to 1500 parts by weight (200 to 500 being more preferred) of such conventional resole resin. In any given instance, the minimum quantity of a particular conventional resole resin employed is such that the total mixture of methylolated, sulfonated product and conventional resole resin is thermosettable at about 110° C.

For purposes of this invention, the term "thermosettable" has conventional reference to resins which solidify and crosslink on heating to produce a substantially solvent insoluble mass which cannot be remelted.

Similarly, the term "conventional water soluble non-sulfonated thermosettable phenol-aldehyde resole resin" or, briefly, "conventional resole resin," has conventional reference to a product formed by the condensation of a phenol with an aldehyde condensable therewith (especially formaldehyde) under base catalyzed (e.g. above pH 7) liquid phase aqueous conditions so that the condensate contains at least 1 mol of combined aldehyde per mol of phenol, and preferably such resin product has a mol ratio of from about 1.2:1 to 3:1 combined aldehyde to phenol. Such resins are well known to the prior art.

To produce a conventional resole resin for use in this invention, a phenol can be neutralized and made basic under aqueous liquid phase conditions, as by the addition of base, and then preferably from about 0.8 to 3.0 mols of aldehyde per one mol of phenol (more preferably from about 1.0 to 2.5 mols aldehyde per mol of phenol) are mixed with the base catalyzed phenol. Phenol itself and formaldehyde are preferred starting materials. Water may be added with the aldehyde. With formaldehyde added, water is preferred, as when Formalin is used. Also, a basic catalyst material conventionally known to the art of resole resins (referred to above), such as hexamethylenetetramine, ammonium hydroxide, triethylamine, sodium hydroxide, or mixtures thereof (or the like) is introduced into the reaction mixture. This basic catalyst can be used to neutralize the starting substituted phenol. The pH of this reaction mixture is maintained above 7.0 and preferably in the range from about 7.5 to 8.5. Typical reaction temperatures range from about 50° C. up to the boiling point (i.e. reflux conditions) of the reaction mixture (temperatures of from about 70 to 80° C. being preferred). Convenient reaction times typically range from about 20 minutes to 4 hours. Aqueous liquid phase preparation conditions are generally but not necessarily used.

The term "aldehyde" has established meanings of scope in the art of thermosetting resins and is used throughout this disclosure and claims in accordance therewith. Although formaldehyde is preferably employed as the aldehyde in the formation of the conventional resins used in this invention, other aldehydes known to the phenol aldehyde resin art, including aliphatic aldehydes, such as acetaldehyde, propionaldehyde, butyraldehyde, and the like; aromatic aldehydes, such as benzaldehyde, and the like; cyclic aldehydes such as furfural aldehyde, and the like, and mixtures of such, are usable to make such resins. Similarly, the term "a phenol" used in reference to a phenol aldehyde resin herein has reference to a compound containing one phenyl group, one or even two nuclear hydroxyl groups which is optionally substituted with a methyl or ethyl group, and which compound is reactable with formaldehyde in water under basic pH. Examples include cresol, xylenol, resorcinol, and the like. It will be appreciated that the aldehyde to phenol ratios herein described have reference to the total amount of a phenol present before a reaction.

For purposes of this invention, such conventional resole resins are employed in the form of aqueous solutions containing from about 30 to 80 weight percent of such resin. More preferred solutions contain from about 60 to 70 weight percent of such resins.

A preferred class of conventional resole resins suitable for use in this invention is characterized by the general fromula:

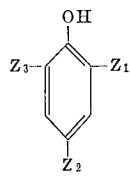

where $Z_1$, $Z_2$, and $Z_3$ are each selected from the group consisting of hydrogen and —$CH_2OH$, and, in any given molecule thereof, at least one of said Z's is —$CH_2OH$; and the water soluble polynuclear derivatives thereof (including dimers and trimers).

The conventional resole resins employed in this invention preferably have a free formaldehyde content which is less than about 5 weight percent (based on total conventional resole resin weight).

Simple physical (mechanical) procedures are generally suitable for mixing a preformed conventional resole resin with a preformed methylolated sulfonated product to make a thermosettable sulfonated resole resin composition for use in this invention. Preferably, such a composition is prepared in the form of an aqueous solution which contains a total of from about 30 to 80 (preferably from about 60 to 70) weight percent (combined) of dissolved methylolated, sulfonated product and of dissolved conventional resole resin. At the time when a conventional resole resin is mixed with methylolated sulfonated product, it is desirable to have the methylolated sulfonated product in a basic form so as to prevent premature or undesired reaction of the sulfonic acid group and (possibly) undesirable premature cross-linking of the product composition.

Those skilled in the art will appreciate from the foregoing teachings that one can conveniently prepare a thermosettable sulfonated resole resin composition for use in this invention in a single vessel or reactor by appropriate reaction techniques and by addition of reactants in a proper sequence and order. For example, one can react phenol with sulfuric acid to form Formula 1 compounds by the preferred route as taught above, and then this material can be neutralized and made basic with excess caustic as taught above. Next, such product is reacted with an excess of formaldehyde (e.g. Formalin) to form a water soluble methylolated, sulfonated product as taught above. Subsequent addition of phenol (preferably immediately) produces a system which with heat will react with excess formaldehyde present to generate in situ a water soluble conventional resole resin. Excess formaldehyde can be added as taught above. Hence, as used herein, the term "mixing" in reference to blending conventional resole with methylolated phenol sulfonic acid includes in situ generation as described herein. Such an aqueous solution of a mixture of methylolated, sulfonated product and conventional resole resin is used in a preferred product of this invention.

To prepare a composition of sand and resin in accordance with the teachings of this invention, one simply admixes the afore-described sulfonated resin composition with the sand mechanically, as in a muller, or the like, so as to produce a mixture comprising from about 95 to 98.5 weight percent sand with the balance up to 100 weight percent thereof being the resin indicated above.

Compositions of this invention, which are intended for use in the manufacture of foundry sand cores having sufficient green strength to be self-supporting and storable, optionally and preferably contain, in addition to the afore-described sand and sulfonated resole resin, minor amounts (preferably under about 4 weight percent based on total composition weight) of a conventional green strength promoter, which can be organic or inorganic in chemical composition, and which is employed in the form of finely divided solid materials whose individual maximum average dimensions are preferably not larger than those of the sand particles employed. Green strength promoters are well known to those of ordinary skill in the foundry arts; any conventional green strength promoter may be employed in the present invention. A preferred organic green strength promoter is cereal, and a preferred inorganic green strength promoter is clay (e.g. bentonite). Sometimes organic and inorganic green strength promoters are used in combination.

It will be appreciated that, when blending the resin with the sand and green strength promoter (when the latter is employed), it is necesary to use greater amounts of water than is the case when no green strength promoter to achieve a resulting green strength improvement in cores made from sand and resin compositions containing such. Usually, an appropriate or suitable amount of excess water is used which is approximately at least equal to, or slightly greater than the amount of green strength promoter used (total weight basis).

To prepare a composition of this invention into a sand core, one simply places such a composition into an appropriate container or mold having interior dimensions desired in the finished sand core, applies pressure sufficient to pack the composition into a mass (usually pressures of at least about 40 pounds/in.² are used), and heats the resulting body to a temperature and for a time sufficient to thermoset the resin therein and thereby form the desired core. In general, curing temperatures range from about 400 to 550° F. while inversely, curing times range from about 30 minutes to 2 hours, though curing times and temperatures which are respectively shorter or longer than these can be used without departing from the spirit and scope of the present invention as those skilled in the art will appreciate.

EMBODIMENTS

The following examples are set forth to illustrate more clearly the principles and practice of this invention to one skilled in the art and they are not intended to be restrictive but merely to be illustrative of the invention herein contained.

Example A

Preparation of thermosettable sulfonated resole resin system with in situ generated phenol-formaldehyde resin. —400 grams of phenol sulfonic acid is dissolved in 150 grams of water and to this mixture is added, with cooling, 220 grams of 50% NaOH. 1350 groups of 50% formalin are added, and the mixture reacted for two hours at 70° C. At this point, presence of dissolved methylolated, sulfonated product is shown by infra-red analysis. To the cooled reaction mixture is added 900 grams phenol and sufficient 50% NaOH to adjust pH to the range of 8–10. Reaction is then continued 3–4 hours at 65–70° C. until the free formaldehyde level is less than 4%. The reaction mixture is then cooled to about 10° C. thus forming an aqueous solution of a resole of Formula 2 with previously formed methylolated, sulfonated products. Sufficient acid is added to adjust the pH to the range of about 6–7.

The resulting solution contains for each 100 parts by weight of methylolated, sulfonated product from about 350 to 450 parts by weight of Formula 2 resole.

Example B

Sulfonated resole preparation from phenol sulfuric acid and aldehyde, and admixture with a phenol-formaldehyde resole.—To 200 grams phenol at 90° C. are added 210 grams of concentrated sulfuric acid over a 60 minute interval, maintaining the temperature at 90° C. 400 grams of water are added and the mixture is cooled while adding 220 grams of 50% NaOH. 1500 grams of 50% Formalin are then added and reacted for 1 hour at 80° C. Infra-red analysis of the reaction mixture shows the presence of hydroxymethyl groups and sulfonic groups, indicating the presence of dissolved methylolated, sulfonated products. The mixture is then dehydrated under reduced pressure to an aqueous resin having solids content of about 60 to 70 weight percent.

100 grams of the above reaction mixture are admixed with 320 grams of a 70 percent solids aqueous solution of a resole of Formula 2 having a combined formaldehyde/phenol ratio of 1.9:1. Sufficient phosphoric acid solution is added during mixing to adjust the pH to the range of about 6-7.

The resulting solution contains for each 100 parts by weight of methylolated sulfonated product about 300 parts by weight of Formula 2 resole.

Example C

Sulfonated resole preparation from phenol-sulfuric acid and aldehyde, and admixture with a phenol-formaldehyde resole.—To 200 grams phenol at 90° C. are added 210 grams of concentrated sulfuric acid over a 60 minute interval, maintaining the temperature at 90° C. 400 grams of water are added and the mixture is cooled while adding 220 grams of 50 percent NaOH. 1500 grams of 50 percent Formalin are then added and reacted for 1 hour at 80° C. Infra-red analysis of the reaction mixture shows the presence of hydroxymethyl groups and sulfonic groups, indicating the presence of dissolved methylolated, sulfonated product. The mixture is then dehydrated under reduced pressure to an aqueous resin having solids content of about 60 to 70 weight percent.

100 grams of the above reaction mixture are admixed with 1200 grams of a 70 percent solids aqueous solution of a resole of Formula 2 having a combined formaldehyde/phenol ratio of 1.9:1. Sufficient phosphoric acid solution is added during mixing to adjust the pH to the range of about 6-7.

The resulting solution contains for each 100 parts by weight of Formula 1 compounds about 1200 parts by weight of Formula 2 resole compounds.

Examples 1-4

The resin compositions of Examples A, B, and C above are each coated onto Ottawa sand to produce a variety of compositions. Each such composition is formed into standard AFS tensile briquettes or cores and subsequently cured at 450° F. for 1 hour. The following proportions of components and product properties are observed:

TABLE I

| | Example | | | | |
|---|---|---|---|---|---|
| | 1 | 2 | 3 | 4 | 5 |
| Resin | A | B | A | A | C |
| Wt. percent resin (based on sand) | 3.5 | 3.5 | 4.5 | 2.5 | 3.5 |
| Wt. percent cereal | 0.3 | 0 | 0 | 0 | .3 |
| Wt. percent clay | 0 | 1.0 | 0 | 0 | 0 |
| Wt. percent water | 0.5 | 1.5 | 0.2 | 0.2 | 0.5 |
| Wt. percent release agent [a] | 0.4 | 0.4 | 0.4 | 0.4 | 0.4 |
| Green strength of the wet sand mixture (in p.s.i.) [b] | 0.3 | 0.8 | 0.1 | 0.05 | 0.3 |
| Baked tensile strengths (in p.s.i.): | | | | | |
| 10 min. cure time | 570 | 400 | 600 | 400 | 400 |
| 20 min. cure time | 515 | 360 | 670 | 375 | 340 |
| 30 min. cure time | 480 | 330 | 630 | 350 | 320 |

[a] Kerosene/oleic acid mixture (4:1 weight ratio).
[b] After forming a standard green strength AFS green strength specimen Preferably, a composition of this invention includes from about 0.2 to 2 percent of green strength promoter. The green strength promoter is composited with the sand and the resin usually and preferably by simply adding the green strength promoter to the sand before the resin is added thereto during the mixing operation used in preparation of compositions of this invention.

Preferred water soluble methylolated phenol sulfonic acids for use in this invention are substantially completely monomeric in structure.

What is claimed is:
1. A composition suitable for the manufacture of foundry sand cores comprising in combination:
   (A) a uniform mixture of from about 95 to 98.5 weight percent sand and the balance up to 100 weight percent being an aqueous solution of thermosettable sulfonated resole resin composition,
   (B) said aqueous solution comprising on a 100 parts by weight total basis:
      (1) from about 30 to 80 parts by weight of thermosettable sulfonated resole resin composition, and
      (2) the balance up to 100 weight percent thereof being water,
   (C) said thermosettable sulfonated resole resin composition comprising:
      (1) water soluble methylolated, sulfonated product produced by condensing under base catalyzed liquid phase aqueous conditions a molar excess of formaldehyde with at least one phenol sulfonic acid characterized in its pure acid form by the general formula:

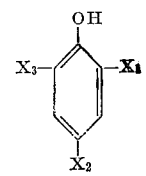

where $X_1$, $X_2$, and $X_3$ are each selected from the group consisting of hydrogen, and —$SO_3H$, and, in any given molecule at least one of said X's is —$SO_3H$, and at least one other of said X's is hydrogen,
said condensing being continued under time, temperature, and pressure conditions which taken together are at least sufficient to methylolate said phenol sulfonic acid, and
      (2) water soluble thermosettable phenol-aldehyde resole resin produced by condensing under base catalyzed conditions a molar excess of a phenol with an aldehyde,
      (3) there being at least sufficient quantities of said phenolaldehyde resole resin present to make the resulting sulfonated resole resin composition thermosettable at 110° C.

2. The composition of claim 1 wherein said methylolated phenol sulfonic acid is produced by condensing said phenol sulfonic acid and formaldehyde under a pH of from about 7.5 to 10 for a time of from 20 minutes to four hours.

3. The composition of claim 2 wherein said methylolated phenol sulfonic acid is substantially monomeric in structure and contains only a single sulfonic group per molecule.

4. The composition of claim 1 wherein said aqueous solution of thermosettable sulfonated resole resin composition contains less than about 5 weight percent based on total resin weight of free formaldehyde.

5. The composition of claim 2 wherein said methylolated phenol sulfonic acid has a combined mol ratio of formaldehyde to phenol determined from the phenol sulfonic acid used of from about 1:1 to 2:1.

6. The composition of claim 1 wherein, for each 100 parts by weight of said methylolated phenol sulfonic acid, there are from about 100 to 1500 parts by weight of said thermosettable phenol-aldehyde resole resin.

7. The composition of claim 1 wherein said thermosettable phenol-aldehyde resole resin has a mol ratio of aldehyde to phenol of from about 1:1 to 3:1.

8. The composition of claim 7 wherein said thermosettable phenol-aldehyde resole resin is composed substantially of phenol and formaldehyde.

9. The composition of claim 1 wherein said thermosettable phenol-aldehyde resole resin is characterized by the formula:

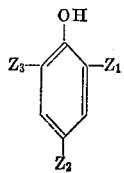

where $Z_1$, $Z_2$, and $Z_3$ are each selected from the group consisting of hydrogen and —$CH_2OH$ and, in any given molecule thereof, at least one Z is —$CH_2OH$, and the water soluble polynuclear derivatives thereof including dimers and trimers.

10. The composition of claim 1 additionally containing composited therewith under about 4 weight percent of a clay.

References Cited

UNITED STATES PATENTS 2,869,196  1/1959  Cooper et al. _____ 260—29.3

OTHER REFERENCES

Kressman et al., Jour. Chem. Soc., 1949, pp. 1190–1193.

DONALD J. ARNOLD, Primary Examiner

U.S. Cl. X.R.

260—38, 840